United States Patent [19]

Tahkokorpi

[11] Patent Number: 5,678,178
[45] Date of Patent: Oct. 14, 1997

[54] SDH NETWORK HAVING DYNAMIC ALLOCATION OF TRANSMISSION CAPACITY

[75] Inventor: Markku Tahkokorpi, Espoo, Finland

[73] Assignee: Nokia Telecommunications Oy, Espoo, Finland

[21] Appl. No.: 356,259

[22] PCT Filed: Jun. 30, 1993

[86] PCT No.: PCT/FI93/00277

§ 371 Date: Dec. 30, 1994

§ 102(e) Date: Dec. 30, 1994

[87] PCT Pub. No.: WO94/00959

PCT Pub. Date: Jan. 6, 1994

[30] Foreign Application Priority Data

Jun. 30, 1992 [FI] Finland ................. 923034

[51] Int. Cl.⁶ ........................................... H04Q 07/34
[52] U.S. Cl. .................. 455/33.1; 455/56.1; 455/53.1; 455/67.1; 370/375
[58] Field of Search ........................ 455/33.1, 34.1, 455/34.2, 54.1, 54.2, 56.1, 53.1, 67.1; 370/85.7, 95.1, 79, 80, 468, 375, 376; 379/59

[56] References Cited

U.S. PATENT DOCUMENTS 4,733,391  3/1988  Golbold et al. ............... 370/85.7 X
5,313,461  5/1994  Ahl et al. ...................... 370/95.1 X

FOREIGN PATENT DOCUMENTS 366342   5/1990   European Pat. Off. .
403203  12/1990   European Pat. Off. .
426269   5/1991   European Pat. Off. .
2138652 10/1984   United Kingdom .

OTHER PUBLICATIONS

"SDH–NY digital hierarki", *Tele*, Feb. 1990, pp. 43–49.
Binder, et al: "Vision O.N.E.–Optimierte Netz–Evolution", Nachrichtentechnik Eletronik, vol. 42, No 2, 1992, pp. 67–71.

*Primary Examiner*—Reinhard J. Eisenzopf
*Assistant Examiner*—Philip J. Sobutka
*Attorney, Agent, or Firm*—Cushman Darby & Cushman Intellectual Property Group of Pillsbury Madison & Sutro LLP

[57] ABSTRACT

A microcellular radio network including a plurality of base transceiver stations and higher-level network elements, such as base station controllers and exchanges, and an SDH transmission network. The base transceiver stations and higher-level network elements are connected to nodes of the SDH network for dynamic establishment of digital transmission links. The network management of the SDH network is capable of dynamic allocation of transmission capacity of the transmission network to base transceiver stations or higher-level network elements according to their traffic load. The traffic load is determined on the basis of the number of transmission channels in use and those not in use, or on the basis of load information obtained from the network management of the radio network.

4 Claims, 1 Drawing Sheet

SDH NETWORK HAVING DYNAMIC ALLOCATION OF TRANSMISSION CAPACITY

FIELD OF THE INVENTION

The invention relates to a microcellular radio network comprising a plurality of base transceiver stations and higher-level network elements, such as base station controllers and exchanges, and a transmission network having node means to which the base transceiver stations and higher-level network elements are connected for dynamic establishment of digital transmission links between the network elements and the base transceiver stations.

BACKGROUND OF THE INVENTION

At present, different kinds of cellular radio or mobile phone systems are in use or under development, in which systems the geographical area covered by the network is divided into separate smaller radio areas called radio cells in such a manner that when a radio telephone or mobile radio station is located within the cell, it communicates with the fixed network through a fixed radio station, or base station, located in the radio cell. The mobile stations belonging to the system may roam freely within the area of the system from one cell to another. The base stations are connected, normally with fixed transmission links (e.g. PCM links), to a mobile exchange either directly or via an intermediate base station controller, which controls the base station system including several base stations. Each base station is provided with a fixed number of traffic channels for setting up calls with mobile stations via a radio path. The transmission link interconnecting a base station and a mobile exchange contains a fixed number of transmission channels equal to the number of traffic channels of the base station. The traffic load caused by mobile stations in cellular radio networks is highly statistical: all available radio channels and traffic channels are never in use at the same time. In practice it is very difficult to predict beforehand where the highest traffic load will be located geographically. Therefore, in conventional macrocellular networks, a fixed number of transmission channels equal to the number of traffic channels of the base station has been allocated for the transmission link between the base station and the switching centre.

In densely populated areas with a high traffic load, the aim is to achieve a cellular network that offers more efficient utilization of radio channels by employing very small and correspondingly a larger number of radio cells. Such a microcellular network comprises a huge number of base stations, wherefore it is practically impossible to predict the distribution of traffic load. On the other hand, the number of traffic channels of the base stations is even greater; consequently, the same large number of fixed transmission channels should be allocated for the transmission links between the mobile exchange and the base stations. In some macrocellular networks where the traffic load in different areas varies clearly at different times of day, manual routing of transmission channels has been employed to different base stations at different times of day. As stated above, the traffic load varies rapidly in microcellular networks and is difficult to predict, and therefore efficient manual allocation and control of transmission channels is impossible.

European Patent Application No. 366,342 discloses a cellular radio network in which the base stations and the other network elements are interconnected, instead of fixed connections, by virtual connections established on a call-by-call basis via a packet switched WAN (Wide Area Network). The routing of the packets loads the switch significantly, wherefore the document discloses procedures for processing the packets in different ways depending on whether the subscriber crosses the cell boundary or not. The disadvantage of the solution based on a packet switched network is that there is not available any general purpose packed switched network, and therefore the network with the required properties should be constructed specifically for this purpose. The solution based on a packet switched network also requires new equipment which can be used only for this purpose, wherefore it is difficult to implement them cost efficiently.

SUMMARY OF THE INVENTION

The object of the present invention is to provide a microcellular radio network with more efficient utilization of transmission channel resources between base stations and higher-level network elements.

This is achieved with a microcellular radio network as defined in the introductory paragraph, this network being characterized according to the invention in that the transmission network is an SDH network and comprises control means for dynamic allocation of transmission capacity of the transmission network to base transceiver stations or higher-level network elements according to their traffic load, determined on the basis of the number of transmission channels in use and those not in use, or on the basis of load information obtained from the network management of the radio network.

In the microcellular network of the invention, the automatic allocation of transmission capacity in the microcellular network is obtained by interconnecting the base stations to higher-level network elements via an SDH (Synchronous Digital Hierarchy) transmission network or the like. The digital transmission channels (such as PCM channels) of base stations and higher-level network elements can then be connected directly to node elements of the SDH transmission network. In these node elements, digital signals are transmitted in SDH frames, so-called STM frames. An advantage of the SDH transmission network is that data of a digital transmission channel can be inserted in an STM frame and removed therefrom in each node element without the STM frame having to be disassembled. On the other hand, the SDH transmission system has efficient standardized network management functions allowing efficient allocation of the transmission capacity of the STM frames between the different nodes of the SDH transmission network and thereby between the base stations and the higher-level network elements. These network management functions of the SDH transmission network can be efficiently utilized for allocating the transmission capacity to the base stations according to their traffic load.

The network management of an SDH network may obtain information on the transmission capacity requirements of individual base stations for instance by monitoring the use of the SDH network or by means of the information on the actual radio traffic load of the radio system received from a mobile exchange or some other higher-level network element.

The improved efficiency gained by the invention is based on the fact that all traffic and signalling channels available at a base station are transmitted to an SDH node. However, only the speech channels that are actually in use (having a call), and one signalling channel are transmitted further from the node. In practice, some reserve transmission capacity has to be allocated for each base station, as the transmission network is not fast enough to switch connections call by call.

The solution of the present invention provides higher degree of optimization in the fixed transmission infrastructure of a microcellular radio network than is possible in prior art networks.

A particularly preferred transmission network configuration is an SDH ring network in which internal safety functions prevent disconnection of the transmission links when the ring is broken.

BRIEF DESCRIPTION OF THE DRAWINGS

In the following, the invention will be described in more detail with reference to the accompanying drawings, in which.

DETAILED DESCRIPTION OF A PREFERRED EMBODIMENT OF THE INVENTION

The present invention is suitable for use in all cellular radio systems in which the transmission channels between base stations and higher-level system components, such as exchanges, are digital or may be converted into digital form. Typical examples of such cellular radio systems are the European mobile radio system GSM, DCS1800 and the PCN (Personal Communication Network).

Figure 1:
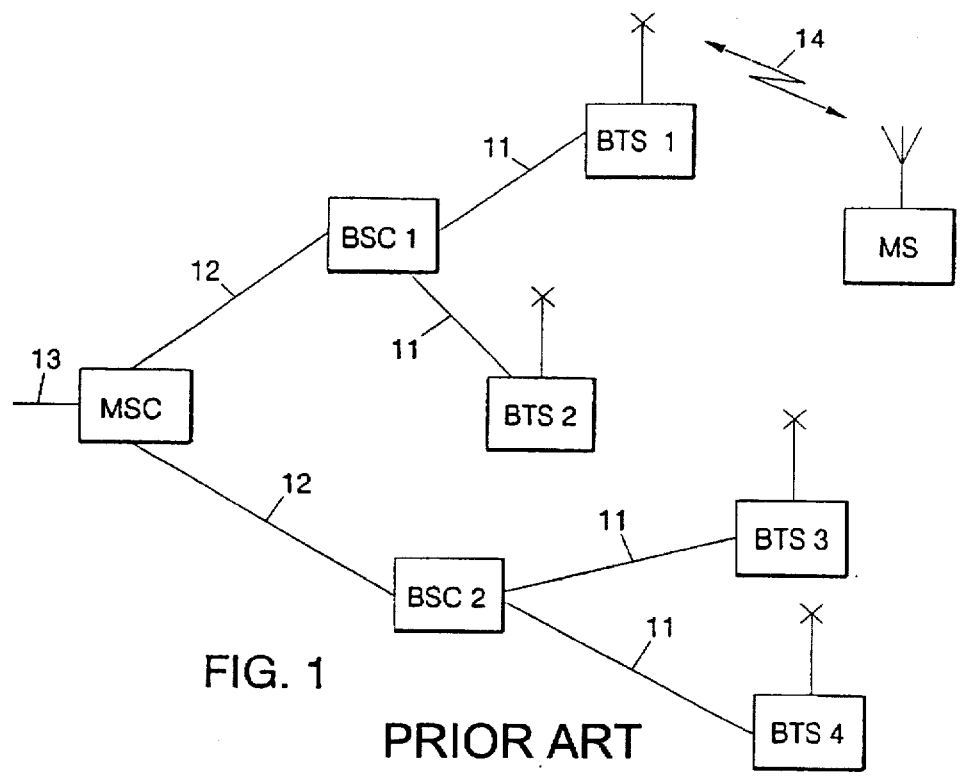
FIG. 1 shows a schematic diagram of a cellular radio system of the prior art.

FIG. 1 illustrates schematically a cellular radio system of the prior art. The highest-level network element is a mobile exchange MSC, to which two lower level network elements BSC1, BSC2 are connected in star topology by digital transmission links 12, which are typically PCM links in compliance with CCITT Recommendation G.703. The transmission channels of the PCM links 12 between the base station controllers BSC1, BSC2 and the mobile exchange MSC include both signalling and traffic channels (speech or data channels). The lowest-level network elements, i.e. base transceiver stations BTS1 and BTS2, and correspondingly base transceiver stations BTS3 and BTS 4, are connected to the base station controllers BSC1 and BSC2 in star topology by PCM links 11. Each of the PCM links 11 includes transmission channels to be used both as signalling and traffic channels. Each of the base stations BTS1–BTS4 has a predetermined fixed number of traffic channels for calls to be set up via a radio path 14 with mobile subscriber radio stations. When a call is set up between a mobile station MS and a base station BTS via a radio path, both of the transmission directions are routed via the PCM links 11 and 12 to the mobile exchange MSC, and therefrom further through a transmission link 13 to another mobile exchange in the same or some other network, or through the links 12 and 11 to another base station under the same mobile exchange MSC, and that way to the subscriber MS. Thus, each call requires two PCM transmission channels between the base transceiver station BTS and the exchange MSC. As stated above, the traffic load of different base stations varies highly statistically, and all traffic channels of all base stations are never in use simultaneously. However, the number of PCM links 11 and 12 of the fixed transmission network must be designed according to the total number of traffic channels of each base station. In microcellular radio networks, where the same geographical area is covered by a much larger number of much smaller radio cells than in a normal cellular network and a larger number of base stations are therefore needed, the number of transmission channels required for the PCM links of the fixed transmission network increases to a great extent. In practice, it is not possible to reduce the capacity required by the transmission links 11 and 12 by using the same transmission channels to different base stations at different times according to their traffic load.

In the microcellular radio network of the invention, base stations and higher-level network elements are not interconnected by fixed data links, but through an SDH transmission network or the like, so that the total number of digital transmission channels offered by the SDH is smaller than the total number of traffic channels of all the base stations. According to the invention, this limited capacity of the transmission network is distributed automatically according to the traffic load to different network elements using the network management functions of the SDH transmission network or the like.

Implementation of the solution of the invention requires cross-connection elements capable of 64 bit/s cross-connection. They may be controlled by network management functions of the SDH network.

As stated above, SDH is an abbreviation for "synchronous digital hierarchy" and refers generally to a new method of multiplexing digital signals as defined in CCITT Recommendations G.707, G.708, G.709, and G.781–G.784. SDH technology is described in more detail, e.g. in the following article, which is incorporated herein with its cross-references:

[1] SDH—Ny digital hierarki, I. Lyrberg et al., TELE, No. 2, 1990, pp. 43–49.

At the peripheral interfaces of the SDH transmission network, digital signals (PCM signals) according to CCITT Recommendation G.703 at transmission rates of 2048 kbit/s, 8448 kbit/s, etc., are multiplexed directly into STM-1 (Synchronous Transport Module) transmission frames.

Figure 2:
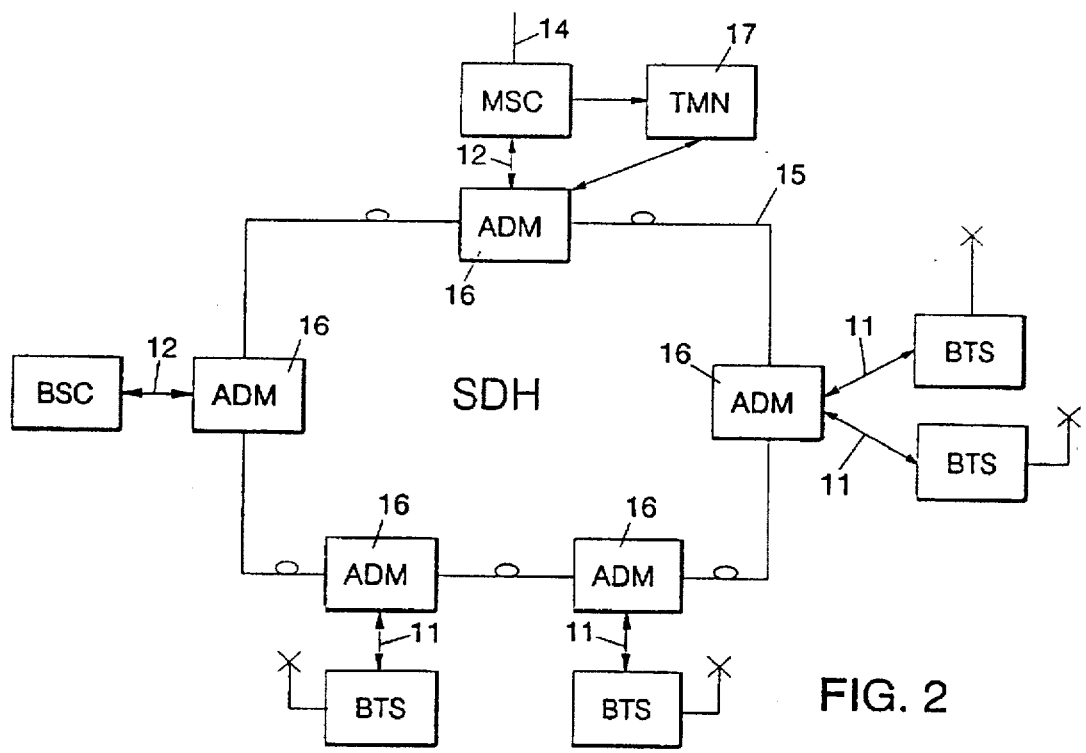
FIG. 2 shows a cellular radio system of the invention in which the fixed transmission network is implemented by an SDH ring.

FIG. 2 illustrates a microcellular radio network of the invention, in which base stations BTS and higher-level network elements BSC and MSC are interconnected through an SDH transmission network. All traffic channels of each of the base stations BTS are linked by the conventional PCM link 11 (in compliance with CCITT G.703) of the base station to the nearest SDH node 16. At the SDH node 16, however, only the traffic channels which have been allocated to an on-going call, and one signalling channel are mapped into STM-1 frames and forwarded to a network node 16 of a higher-level network element MSC or BSC, and therefrom through a PCM link 12 to the network element. Thus, only the active traffic channels of the base stations reserve the capacity of the SDH transmission network. The SDH transmission network establishes links between different nodes 16 and the network elements MSC, BSC and BTS according to the traffic load of the network. Reconfiguration speed of the network is not necessarily high enough for allowing the establishment of SDH links on a call-by-call basis, wherefore it may be preferable in practice to allocate a reserve capacity of a few free transmission channels continuously for each base station in addition to the transmission channels having on-going calls.

In FIG. 2, the SDH transmission network is controlled in a centralized manner by a network management computer 17 connected to the SDH network via a node 16. In the preferred embodiment of the invention, the TMN 17 is connected directly to the network management system of the mobile exchange MSC, which delivers information on the actual traffic load of each of the base stations in the microcellular radio network. This traffic load information may consist of, for example, the number of on-going calls at each base station. On the basis of the information received, the TMN 17 controls the configuration of the SDH transmission network. Alternatively, the nodes 16 may be arranged to monitor the actual transmission capacity in use. This monitoring may be effected, for instance, so that the nodes 16 or the network elements MSC, BSC or BTS transmit a predetermined idle signal on channels allocated to them but not in use, whereby it is possible to measure the traffic on an OSI level 1. When a base station BTS or a node observes that its traffic load increases, it may request more transmission capacity from the network management computer TMN 17. According to still another alternative, by monitoring the traffic at its own node 16, the TMN 17 may recognize the channels that are not in use on the basis of the above-mentioned idle signal, and determine the traffic load of each base station or lower level network element on the basis of the number of transmission channels that are in use and those that are not in use.

The nodes 16 of the SDH network are typically implemented by Add-Drop multiplexers ADM.

The most preferable SDH network structure is a ring network, as malfunction of a single node 16 or a failure of link 15 between two nodes does not prevent the operation of the whole transmission network; the SDH network is able to route the transmission channels from another direction.

The figures and the description relating to them are intended merely to illustrate the present invention. In its details the microcellular radio network may vary within the scope of the attached claims.

I claim:

1. A microcellular radio network, comprising:

a plurality of base transceiver stations and higher-level network elements, and a transmission network having node means to which the base transceiver stations and higher-level network elements are connected for dynamic establishment of digital transmission links between the network elements and the base transceiver stations;

said transmission network being an SDH network including control means for dynamic allocation of transmission capacity of the transmission network to said base transceiver stations or higher-level network elements according to their traffic load, determined on the basis of the number of transmission channels in use and those not in use, or on the basis of load information obtained from the network management of the radio network;

said base transceiver stations or higher-level network elements being arranged to transmit a predetermined idle signal on the transmission channels allocated to them but not in use; and said control means comprising means for recognizing the channels not in use on the basis of said idle signal, and means for defining the traffic load of each base transceiver station or higher-level network element on the basis of channels in use and those not in use.

2. A microcellular radio network according to claim 1, wherein:

said load information includes the number of on-going calls.

3. A microcellular radio network according to claim 1, wherein:

said transmission network is a ring network.

4. A microcellular radio network according to claim 1, wherein:

said node means of the SDH transmission network comprises elements capable of routing 64 kbit/s signals.

* * * * *